(12) United States Patent
Protz et al.

(10) Patent No.: US 6,406,652 B1
(45) Date of Patent: Jun. 18, 2002

(54) PROCESS OF MAKING A HELICAL RIBBON

(75) Inventors: William F. Protz, Lake Forest, IL (US); William L. Lehman, Whitelaw, WI (US)

(73) Assignee: Santa's Best, Northfield, IL (US)

( * ) Notice: Subject to any disclaimer, the term of this patent is extended or adjusted under 35 U.S.C. 154(b) by 0 days.

(21) Appl. No.: 09/498,680

(22) Filed: Feb. 7, 2000

(51) Int. Cl.[7] .............................. B26D 1/03; B26D 1/147; B29C 53/12
(52) U.S. Cl. ..................... 264/138; 264/160; 264/282
(58) Field of Search .............................. 264/138, 151, 264/160, 168, 282

(56) References Cited

U.S. PATENT DOCUMENTS 2,326,174 A  *  8/1943  Rutishauser ............ 264/282 X
3,363,041 A  *  1/1968  Schichman et al. ......... 264/282
3,398,220 A  *  8/1968  Port et al. ............... 264/282 X

* cited by examiner

Primary Examiner—Leo B. Tentoni
(74) Attorney, Agent, or Firm—Barnes & Thornburg

(57) ABSTRACT

The present invention is directed to a helical ribbon, and method and apparatus for making same. The helical ribbon is formed from a resilient ribbon having first and second surfaces and a length substantially longer than its width. A plurality of spaced-apart crimps extending across the width of the ribbon are formed in the first surface of said ribbon whereby said plurality of crimps cause the ribbon to curl back onto itself. The resilient ribbon used to form the helical coil of the invention must be sufficiently rigid to take and hold a crimp rather than merely bending, yet be pliable enough that the process of forming the crimp does not cause the ribbon to break. The invention also includes decorative items made from one or more of such helical ribbon(s).

6 Claims, 5 Drawing Sheets

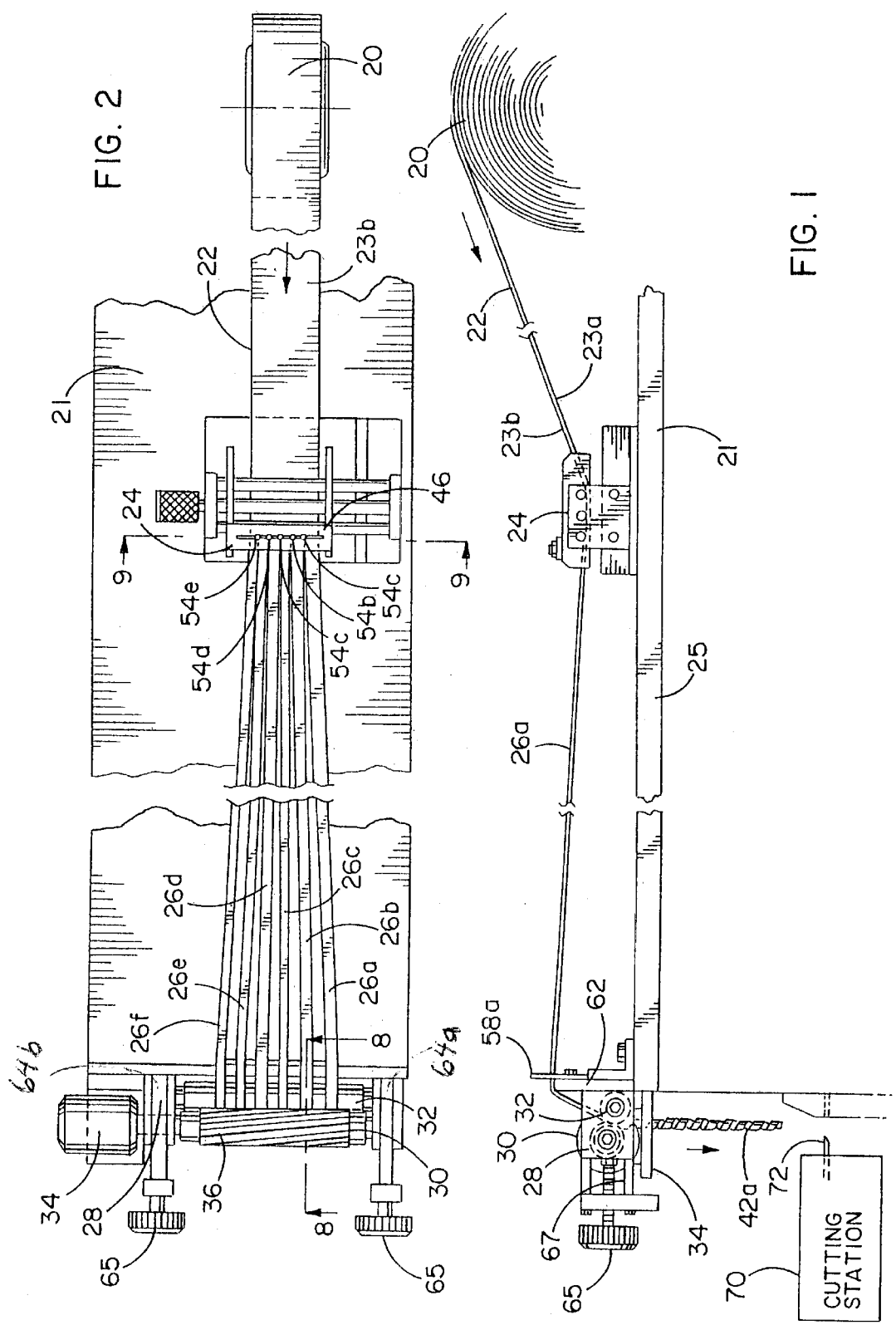

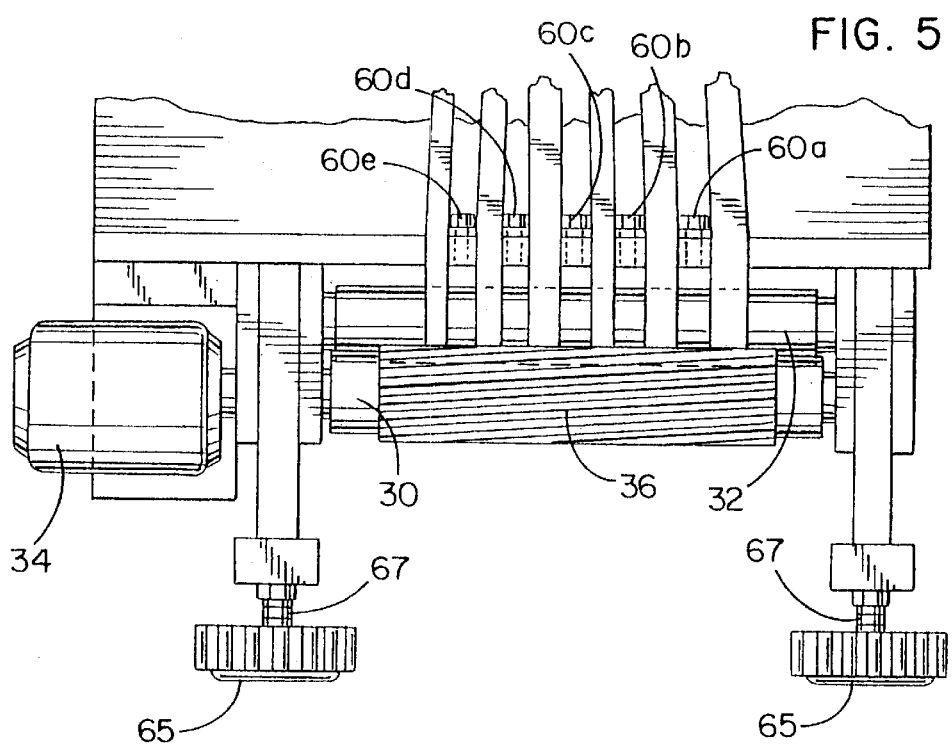
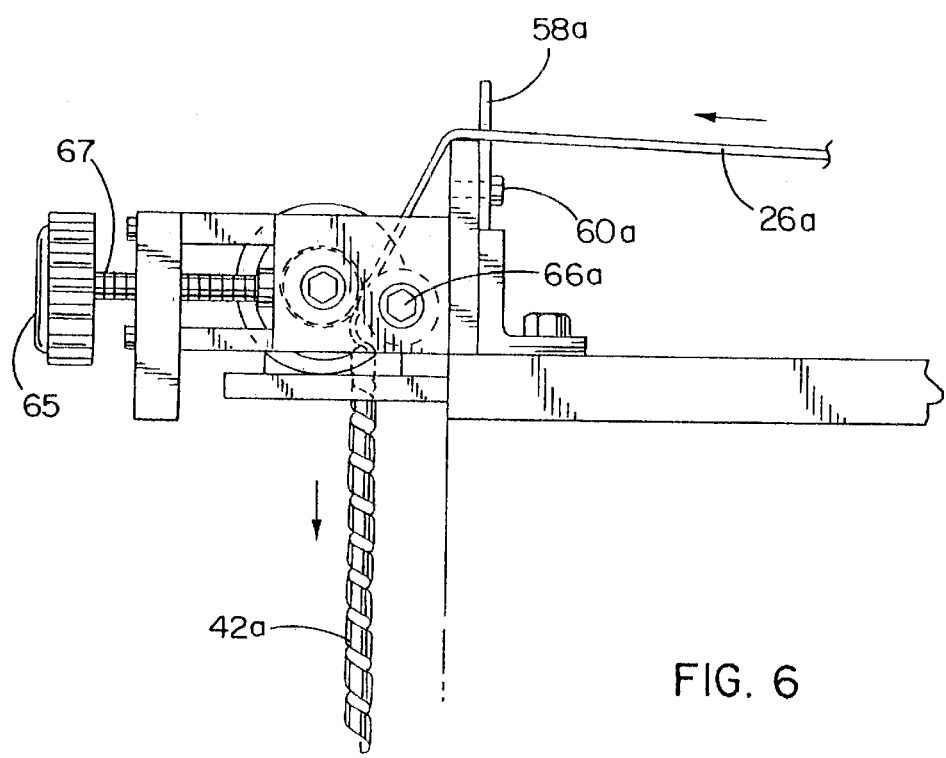

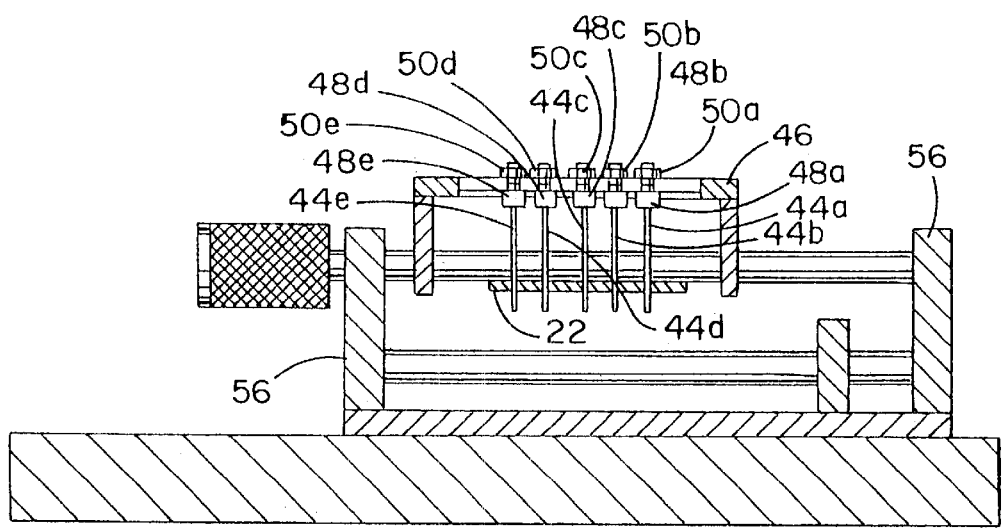
FIG. 9
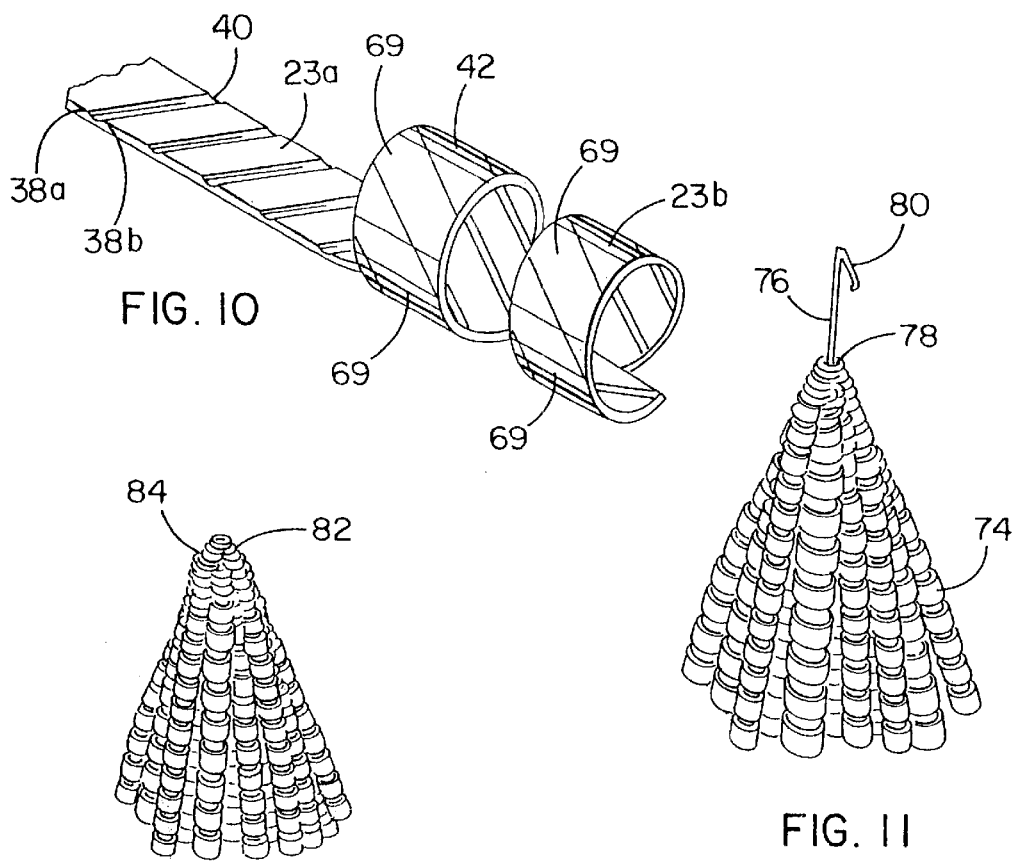
FIG. 10
FIG. 11
FIG. 12

PROCESS OF MAKING A HELICAL RIBBON

FIELD OF THE INVENTION

The present invention is directed to a helical ribbon made of a relatively thin resilient material, decorative elements formed from such ribbon, and a method manufacturing such ribbons and decorative elements.

BACKGROUND OF THE INVENTION

Prior to the present invention, it was known to form helically coiled ribbons for use as decorative elements such as, Christmas tree ornaments, decorations for wrapped gifts, and streamers. Those prior helically coiled ribbons were typically formed from a straight length of foam polypropylene ("FPP") or from an FPP laminate that was wrapped around a cylindrical member and heated to a temperature sufficient to cause the coiled shape to set in the ribbon. The process of thermosetting a helical coil into a section of ribbon was a time consuming, batch process which rendered the resultant coiled ribbon more costly than is desirable. Thus, there is a need for a less expensive method for manufacturing helically coiled ribbon.

A further difficulty with the prior thermosetting process was that it did not work very well with ribbons made from materials other than FPP, particularly ribbons that had metalized films, holographic images or other glossy surfaces. Such glossy finish ribbons are typically made from polyvinyl chloride (PVC), polyethylene terephtalate (PET), orientated polypropylene (OPP) or laminates thereof. The length of time the ribbon was thermoset and the temperature of the cylinder were critical parameters that had to be controlled within very narrow ranges for ribbons with glossy finishes. With those materials, the prior thermosetting process tends to dull the glossy surface of the material if the time or temperature parameters fall even slightly outside the critical range. Any significant dulling of the gloss of the material diminishes the attractiveness of the resulting coiled ribbon. In fact, it is generally recognized that enhancement of the reflective properties of coiled ribbon is a desirable goal. Accordingly, there is a further a need for a method ribbon is a desirable goal. Accordingly, there is a further a need for a method for forming coiled ribbons that will enhance, rather than dull the reflective properties of the surface of a glossy ribbon material.

SUMMARY OF THE INVENTION

The present invention is directed to a helical ribbon formed from a resilient ribbon having first and second surfaces and a length substantially greater than its width. A plurality of spaced-apart crimps extending across the width of the ribbon are formed in the first surface of said ribbon whereby the plurality of crimps cause the ribbon to curl back onto itself. Preferably, the crimps on the first surface of the ribbon cause the ribbon to bend in a manner which forms a plurality of flattened surfaces, or facets, on the outer, second surface of the ribbon. This faceted effect increases the reflective properties of the helical ribbon relative to an non-faceted helical ribbon. The resilient ribbon used to form the helical coil of the invention must be sufficiently rigid to take and hold a crimp rather than merely bending, yet be pliable enough that the process of forming the crimp does not cause the ribbon to break. Examples of resilient ribbons having the required properties include non-plasticized PVC, PET, acetate and PVC/OPP laminates. Ribbon made of FPP is not such a resilient ribbon material since it is not sufficiently rigid to hold crimps and, thus, cannot be coiled by the method of the present invention.

In another preferred embodiment of the invention, a decorative item is provided which includes (a) at least one helical ribbon having first and second surfaces, said at least one resilient ribbon having a length substantially in excess of its width; said first surface having a plurality of crimps spaced apart and extending across the width of the ribbon whereby said plurality of crimps cause the ribbon to bend into a helical structure and (b) a securing member having a loop portion to retain said at least one helical ribbon and having a fastening portion to affix said at least one helical ribbon to another structure. The decorative element is preferably formed of about six strands of helical ribbon of approximately fourteen inches in length. Preferably, the strands are gathered at their approximate mid-point by a securing member having a loop portion adapted to hold the strands. The other end of the securing member preferably has a fastening portion, such as a hook, which is adapted to hang the decorative item from a Christmas tree or other structure. Alternately, the decorative item may be used to decorate a wrapped package in which case, a different securing member is preferred. In such an embodiment of the invention, the securing member includes a loop portion formed by a staple and a fastening portion formed by a paperboard or similar backing material with an adhesive on its back surface to adhere it to a package or other substantially flat surface.

In a further preferred embodiment of the invention, an apparatus for forming a helical ribbon is disclosed including: a support for rotatably securing a web of ribbon material, a drive motor for passing the ribbon through the apparatus and a crimping assembly operatively attached to said drive motor. The crimping assembly preferably includes a crimping die and a resilient roller mounted coaxially adjacent one another. If desired, the apparatus may include a station for slitting the web into a plurality of ribbons and/or a cutting station for cutting the resulting helically curled ribbons to a desired length. The drive motor may be operatively attached to either the crimping die or the resilient roller to rotate it to pass the ribbon material through the crimping assembly.

In another embodiment of the invention, a method for forming the helical ribbon of the invention is provided. The method includes the steps of passing a resilient ribbon having a length and width to a crimping station; forming a plurality of crimps in a first surface of said resilient ribbon which extends across the width of said resilient ribbon whereby said plurality of crimps causes the resilient ribbon to curl into a helical ribbon. Optionally, the resilient ribbon may be cut to a desired length.

In another embodiment of the invention, a method of forming a decorative item is disclosed which includes the steps of feeding at least one resilient ribbon having a length and width to a crimping station; forming a plurality of crimps on a first surface of said at least one resilient ribbon which extends substantially across the width of said resilient ribbon whereby said crimps cause said at least one resilient ribbon to curl into at least one helical ribbon structure; cutting said at least one helical ribbon structure to a desired length; securing said at least one ribbon structures with a loop.

BRIEF DESCRIPTION OF THE DRAWINGS

FIG. 1 is a fragmented side elevational view of one embodiment of the apparatus for forming a helical ribbon in accordance with the present invention showing a web of ribbon material, slitting station, spacers, drive motor, crimping assembly and cutting station;

FIG. 2 is a fragmented top elevational view of apparatus shown in FIG. 1;

FIG. 5 is a top elevational view of crimping assembly shown in FIG. 1;

FIG. 6 is a cross sectional view of crimping assembly and spacers taken along lines 6—6 of FIG. 2;

FIG. 9 is a cross sectional view of slitting station taken along lines 9—9 of FIG.2;

FIG. 10. is a helical ribbon in accordance with one preferred embodiment of the invention with a portion of the ribbon straightened to illustrate the crimps on the first side of the ribbon;

FIG. 11 is a decorative item in accordance with one preferred embodiment of the invention showing a plurality of helical ribbon structures and a securing member including a hook; and FIG. 12 is a decorative item in accordance with one preferred embodiment of the invention showing a plurality of helical ribbon structures and a securing member including a paper board backing.

DETAILED DESCRIPTION OF THE PREFERRED EMBODIMENT

Figure 7:
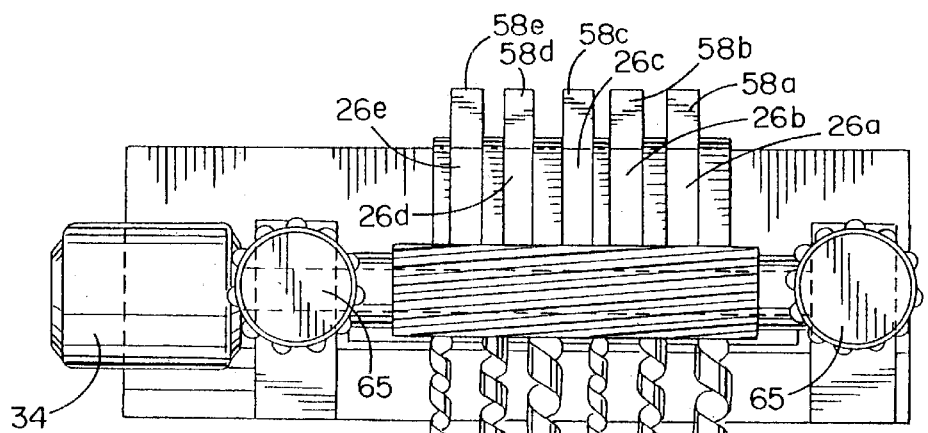
FIG. 7 is a front view of crimping assembly shown in FIG. 2 showing the ribbon material before and after crimping with arrow indicating the direction of movement of the coiled ribbon.
Figure 8:
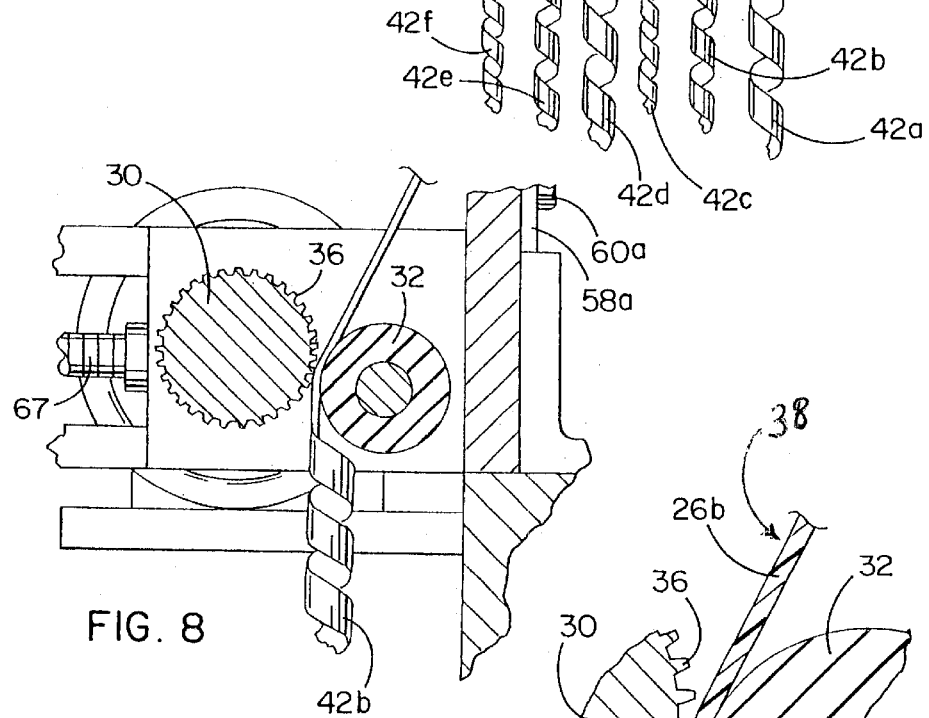
FIG. 8 is a cross sectional view of crimping assembly taken along lines 8—8 of FIG. 2 showing the ribbon material prior to and after crimping and the resultant helical ribbon.
Figure 8A:
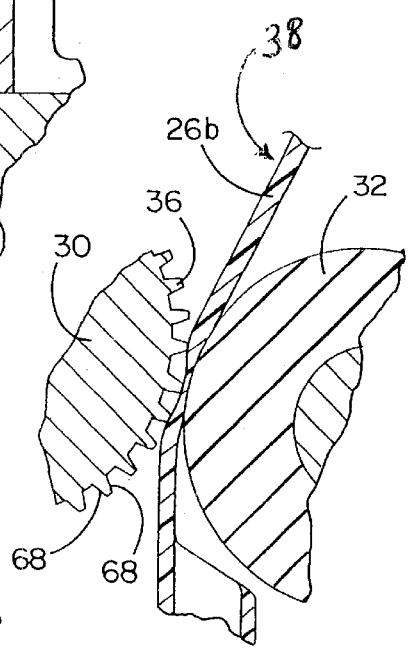
FIG. 8A is an enlarged cross sectional view of crimping assembly taken along lines 8—8 of FIG. 2 showing the ribbon material being crimped between the crimping die and resilient roller.

The helical ribbon of one preferred embodiment of the invention as well as the preferred method and apparatus for manufacturing it can be generally understood by reference to FIGS. 1–12. Generally, FIG. 1 illustrates a coiling apparatus 21 having a web 20 of resilient ribbon material 22 rotatably mounted to a base (not shown). The resilient ribbon material 22 has first and second surfaces 23a and 23b passes through a slitting station 24 mounted to a frame 25. The slitting station 24 operated to split the resilient ribbon material 22 into six ribbons 26a–f which are separated by spaces 58a–e and then pass to a crimping assembly 28 including crimping die 30 and resilient roller 32. The crimping die 30 and resilient roller 32 are rotatably mounted adjacent to one another on the frame 25. A drive motor 34 operatively coupled to crimping die 32 advances the ribbons 26a–f between the crimping die 30 and resilient roller 32. As can best been seen in FIGS. 4 and 8A, a series of raised teeth 36 impinge on a first surface 38 of the ribbons 26a–f causing a plurality of crimps 40 to be formed in the first surface 23a of the ribbons 26a–f. The plurality of crimps 40 causes the ribbon to curl back on to itself relative to the first surface 23a of the ribbons 26a–f to form helical ribbons 42a–f as can be seen in FIGS. 7 and 10.

More specifically, for purposes of the present invention, the terms "resilient ribbon material" and "resilient ribbon" means a thin film of material which is sufficiently rigid to bend and hold a crease when it is impinged by the raised teeth 36 of the crimping die 30, yet pliable enough that such impingement does not cut the resilient ribbon material. Applicant has used a number of resilient ribbon materials to form helical ribbons of the invention, including non-plasticized PVC, PET and laminates of PVC and OPP. It is further believed that acetate ribbon is a resilient ribbon material as herein defined which will form the helical ribbon structure of the invention. On the other hand, ribbons made of FPP have been found to lack the properties necessary to qualify as a resilient ribbon material since it is not sufficiently rigid to hold crimps and, thus, cannot be coiled by the method of the present invention.

The range of thicknesses of the resilient ribbon materials to be used with the method of the invention depends to some extent on the density of the film and whether a loose or tight structure to the helical ribbon is desired. Since the tightness or the helical structure depends upon the effects of gravity bearing on the weight of the ribbon, relatively heavy or dense ribbons will tend to hang down further with greater distance between adjacent curls of the helical structure. For films of non-plasticized, PVC, thickness within the range of 1.4 mil to 9 mil are contemplated with preferred range between 2 mils and 4 mils. For films of PET, thickness within the range of at least 2 mils are contemplated with preferred range between 2 mils and 4 mils. The preferred resilient ribbon material is a non-plasticized, PVC film of 2.8 mil thickness laminated with a OPP film of 0.8 mil thickness for a total thickness of 3.6 mil.

The base for holding the web 20 of resilient ribbon material 22 is a conventional base for holding a web having an shaft member which is received in a central bore in the web. The web is preferably provided with a conventional drag mechanism to provide between 8 ounces and two pounds of web tension. The preferred width of the resilient ribbon material 22 is one and one quarter inches to provide six ribbons 26a–f having widths of five-sixteenths of an inch, three-sixteenths of an inch, one-eighth of an inch, five-sixteenths of an inch, three-sixteenths of an inch, and one-eighth of an inch, respectively. As can be seen in FIG. 7, the width of the resilient ribbons selected for ribbons 26a–f is proportional to the tightness of the helical structure of the resulting helical ribbons 42a–f with thinner ribbons 26c and 26f having the tightest structure with a curl diameter of about eleven-thirty-seconds of an inch and a gap between adjacent curls of about one-sixteenth of an inch, intermediate ribbons 26b and 26e having a somewhat looser structure with a curl diameter of about three-eighths of an inch and a gap between curls of about three-thirty-seconds of an inch, and thickest ribbons 26a and 26d having the loosest structure with a curl diameter of about one-half of an inch and a gap between curls of about one-quarter of an inch. While the dimensions listed above are preferred, a wide variety of ribbon widths may be used to form the helical ribbon of the invention with resulting variable curl diameters and gaps between adjacent curls. It is further contemplated that the ribbon material could be split into a plurality of ribbons of a single desired width rather than varying widths as shown in FIG. 7.

Figure 3:
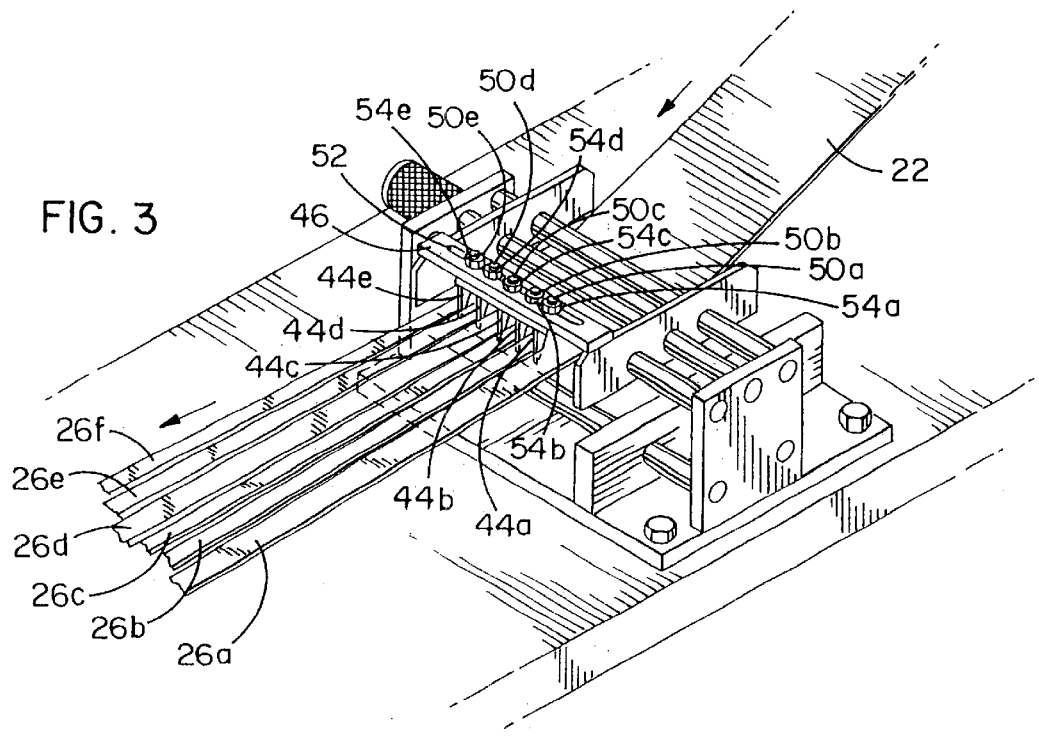
FIG. 3 is a perspective view of the slitting station shown in FIG. 1 with arrows indicating the direction of movement of the ribbon.
Figure 4:
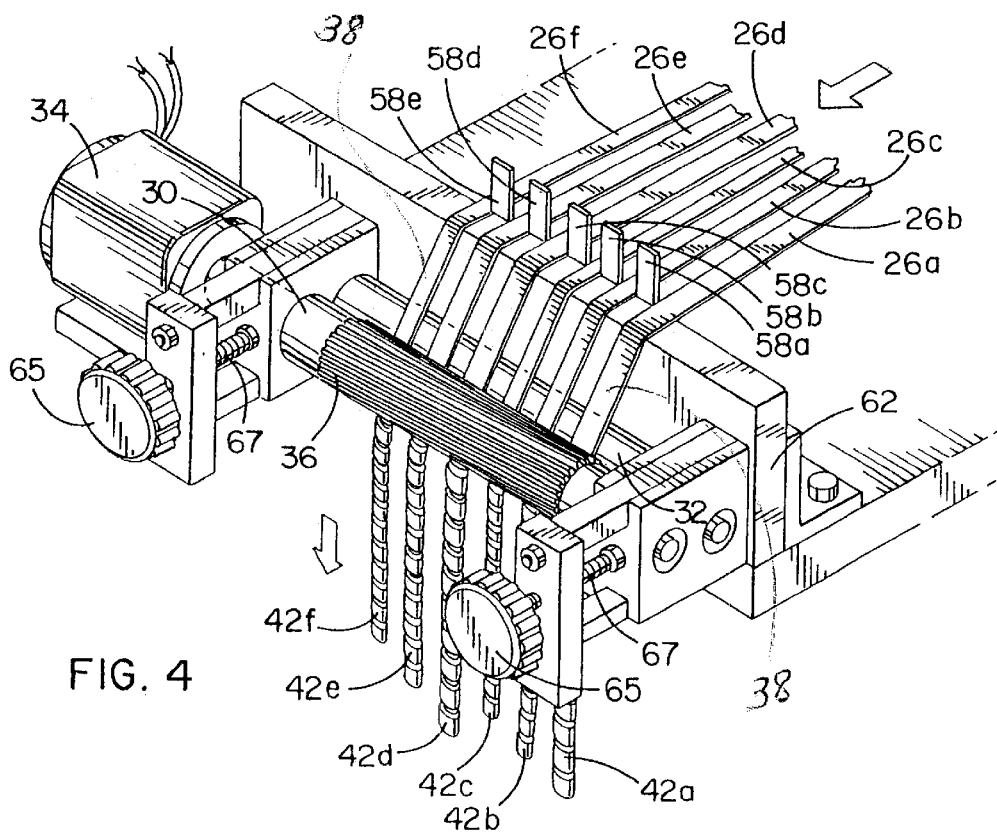
FIG. 4 is a perspective view of the spacers and crimping assembly shown in FIG. 1 with arrows indicating the direction of movement of the ribbon.

As can be best seen in FIGS. 3 and 9, the splitting of the resilient ribbon material is accomplished in the slitting station 24 which includes five razor blades 44a–e. The razor blades 44a–e are adjustably mounted to a support bar 46 by means of mounting blocks 48a–e fixed to the razor blades 44 which have bolts 50a–e passing up through a slot 52 in the support bar 46. Bolts 50a–e are secured by nuts 54a–e tightened down on the top side of the support bar to hold the razor blades 44 in place. The support bar 46 is mounted to a support structure 56 which is in turn mounted to the frame 25. The width of ribbon produced at the slitting station 24 may be varied by loosening one or more of the bolts 50a–e, sliding blade(s) a desired distance from the other blade(s) and the tightening the bolt(s) at the new position(s). It is further contemplated that a single ribbon of a desired width may used in the method and apparatus of the invention, rather than a wider ribbon split into a plurality of the ribbons of desired widths as shown in the preferred embodiment of FIGS. 1–12. If a single ribbon is to be run through the coiling apparatus 21, a slitting station may be either omitted from the a coiling apparatus 21 or the blades 44a–e may be raised or removed the slitting station 24.

As can be seen in FIGS. 1, 5, and 6, spacers 58a–e are provided adjacent to the crimping assembly 28 to prevent the ribbons 26a–f from crossing or overlapping during the crimping process. The spacers 58a–e are mounted by bolts 60a–e threaded into threaded openings in flange 62 which extends up from the frame 25. The spacers 58a–e are mounted in a manner so that the distance between them is slightly larger than the width of the corresponding ribbon 26b–e which pass between adjacent spacers. It is contemplated that spacers may be omitted from the coiling apparatus if a single ribbon is to be crimped. The ribbons 26a–f pass over the top of the flange 62.

As can be best seen in FIGS. 1, 2, 4 and 6, the crimping assembly 24 includes a resilient roller 32 rotatably mounted between arms 64a and 64b extending from the frame 25. The resilient roller 32 is rotatably mounted by insertion of an shaft portion (not shown) into apertures in the arms 64a and 64b and secured by bolt 66a. The roller is made of a relatively, firm resilient material which will deflect when impinged upon by the raised teeth 36 of the crimping die 30. It is contemplated that relatively firm resilient materials with durometer hardness readings of between 75A and 105A are suitable with a preferred hardness of 95A. The preferred material for the resilient roller is 95A durometer polyethylene having a diameter of one and seven-eighths of an inch. Preferably, the shaft of the resilient roller is operatively coupled to the drive motor 34 to cause the ribbons 26a–f to pass through the crimping assembly. The resilient roller 32 is mounted adjacent to the crimping die 30 and spaced so that the raised teeth 36 of the crimping die 30 impinge on the resilient roller 32.

The crimping assembly further includes a crimping die 30 rotatably mounted between arms 64a and 64b extending from the frame 25. The crimping die 30 is rotatably mounted by insertion of an shaft portion (not shown) into a sliding bearing blocks mounted in apertures in the arms 64a and 64b and secured by a bolt 66a on one end and, in the configuration shown in FIGS. 1–12, on the other end by operative connection to the drive motor 34. Adjustment knobs 65 are connected to threaded push bolts 67 which when tightened move the crimping die toward the resilient roller 32 to control the pressure imparted by raised teeth 36 on the resilient roller 32. It is preferred that the resilient roller 32 and crimping die be mounted coaxially so that they may be mounted within the same sliding bearing blocks. Preferably, the adjustment nobs are tightened until the raised teeth 36 sink twenty-thousandths of an inch into the resilient roller 32. The pressure imparted by the teeth is another parameter which affects the tightness of the resultant helical structure of the resilient ribbon. In general, the more pressure created by the teeth on the resilient ribbon, the more bend placed in the ribbon and the tighter the helical structure.

The raised teeth 36 of the crimping die 30 may run parallel to the axis of the crimping die or diverge somewhat from parallel. The range of divergence from parallel for the teeth depends on the desired tightness of the helical structure, that is, the diameter of curl and gap between curls. The tighter the desired helical structure of the resultant ribbon, the further the angle of the teeth should diverge from the axis of the crimping die. Assuming that the resilient ribbons 26a–f runs perpendicularly to the axis of the crimping die, the angle of divergence from the axis of the die will also diverge the same amount from an angle normal to, or perpendicular with, the edge of the ribbons. The raised teeth 36 preferably have a squared-off end surfaces 68 with a width of about ten-thousandths of an inch. The squared-off ends are advantageous since, when sunk into the resilient roller, both the lead edge and back edge of end surfaces 68 form a crease in the ribbons 26a–f. Thus, as can be seen in FIG. 10, with the preferred raised teeth each crimp in the first surface of ribbons 26a–f includes a pair of creases 38a and 38b spaced about one-ten-thousandth of an inch apart. The use of a raised tooth with squared off end surfaces causes a relatively tight curl in the resulting helical ribbon since each crimp is comprised of two creases which causes the ribbon to curl back on itself more than if the same number per unit length of single crease crimps are used. Raised teeth with other end surfaces may also be used, such as narrower teeth with rounded corners, that would result in the formation of just one crease per crimp. Holding all other variables constant, the use of a crimping die that forms just one crease per crimp would result in a looser helical ribbon structure since there would be less crimps per length of ribbon. Similarly, the spacing between adjacent teeth 36 on the crimping die will also affect the relative tightness of the resultant helical structure with more densely spaced teeth providing a tighter structure. However, the teeth should be spaced apart far enough that only a single teeth impinges on the resilient ribbon and resilient roller at any given time since too closely spaced teeth may cause the ribbon to break when stretched between simultaneously impinging teeth.

For the preferred non-plasticized PVC/OPP resilient ribbon material, the preferred crimping die has a diameter of one and five-eighths inches. It has forty squared-off raised teeth spaced one eighth of an inch apart each having a height of about forty-five-thousandths of an inch; the squared-off surface of the tooth having a width from edge to edge of about ten-thousandths of an inch; the angle of the teeth diverging about eight degrees from the axis of the die. As shown in FIG. 10, the use of the preferred die with the preferred pressure and ribbon material results in a helical ribbon with a plurality of crimps formed by pairs of creases in the first side 23a or inside of the helical structure and a plurality of flattened or faceted surfaces 69 on the second surface 23b of the ribbon material. The faceted appearance of the helical ribbon is preferred since the individual flattened surfaces of the facets 69 have enhanced reflective properties relative to non-faceted coiled ribbons. It is contemplated that the process parameters may be altered to produce helical ribbons of the present invention with little or no faceted appearance in the second surface 23b.

The preferred mount for the crimping die would be to have it secured at both ends with mounting bolts and have the resilient roller attached at one end to the drive motor (not shown). The preferred crimping die is shown with continuous raised teeth 36 extending across the length of the die which result in crimping from edge-to-edge across the width of the ribbon. It is contemplated that the raised teeth could extend discontinuously across the length of the die which would result in the formation of crimps that do not extend all the way across the width of the ribbon. The diameter of the die may vary based on the size of the resilient roller to be used. Preferably, the diameter of the rubber roller is slightly larger than that of the crimping die. As set forth above, the thickness and density of the ribbon, the pressure applied to the resilient ribbon, the angle of divergence of the teeth from the axis of the die, and the spacing of the teeth, will also effect the tightness of the resultant helical ribbon structure and those variable are taken into account when designing a crimping die to produce a helical ribbon with desired characteristics.

A drive motor 34 is mounted to the frame 25 and rotatably connected to the crimping assembly at either the crimping die 30 or the resilient roller 32. The connection is preferably by direct drive of the shaft of either the crimping die 30 or the resilient roller 32 although a suitable gear drive may also be used. The drive motor should be capable of advancing the ribbon through the coiling apparatus 21 at a speed of at least 200 inches per minute with a drag friction of between eight ounces and two pounds of web tension. The preferred drive engine is a one-fifth horsepower electric motor generating three hundred sixty inch pounds of torque. The engine is preferably electrically connected to an on/off switch for the coiling apparatus 21. A wide variety of other drive engines could be used in the coiling apparatus of the invention.

The coiling apparatus may optionally contain a cutting station 70 mounted to the frame 25 below the crimping assembly. The cutting station is equipped with cutting blades 72 for cutting the helical ribbons 42 at a desired length. Preferably, the cutting blades would be activated based on a predetermined time period it would take the coil apparatus 21 to produce a desired length of helical ribbon. Another option is to manually cut and gather the helical ribbons 42 in which case the cutting station may be omitted from the coiling apparatus 21. After passing through the cutting station, the cut helical ribbons may then be gathered into a decorative item as explained below. Alternately, the helical ribbon may be used as a decorative item in its individual strand form, for example, as helical tinsel to decorate Christmas trees or as strands to decorate wrapped gifts.

In operation, the coiling apparatus 21 provides a preferred method of manufacturing a helical ribbon in which a web 20 of resilient ribbon material 22 is provided to the coiling apparatus 21. The resilient ribbon material 22 passes through a slitting station 24. The slitting station 24 splits the resilient ribbon material 22 into six ribbons 26a–f which pass to a crimping assembly 28 including crimping die 30 and resilient roller 32. The crimping die 30 and resilient roller 32 are rotatably mounted adjacent to one another on the frame 25 such that a plurality of raised teeth on the crimping die will sequentially impinge on the resilient roller. A drive motor 34, operatively coupled to resilient roller 32, advances ribbons 26a–f between the crimping die 30 and resilient roller 32. As can best been seen in FIGS. 4 and 8A, a series of raised teeth 36 impinge on a first surface 23a of the ribbons 26a–f causing a plurality of crimps 40 to be formed in the first surface of the ribbons 26a–f. The plurality of crimps 40 causes the ribbon to curl back on to itself relative to the first surface 23a of the ribbons 26a–f to form helical ribbons 42a–f as can be seen in FIGS. 7 and 10. The method may optionally include cutting the helical ribbons 42a–f to a desired length.

As shown in FIGS. 11 and 12, decorative items may be fashioned from the helical ribbons in accordance with another aspect of applicants' invention. The decorative item shown in FIG. 11 includes a plurality of helical ribbons 42 having first and second surfaces. The first surface of the plurality of ribbons 74 has a plurality of crimps 40 spaced apart and extending across the width of the ribbons 74 whereby said plurality of crimps 40 cause the ribbons 74 to bend into a helical structure. The plurality of helical ribbons are held together by a securing member 76 having a loop 78 on a first end to retain the plurality of helical ribbons and a hook 80 on a second end for hanging the decorative item on a structure. The decorative element of FIG. 11 is preferably formed of about six strands of helical ribbon of approximately fourteen inches in length. The ribbons 74 are gathered at their approximate mid-point by the loop adapted to hold the strands although the ribbons may be arranged so that the loop retains them at their ends or at some other position along their length.

Alternately, the decorative item as shown in FIG. 12 may be adapted to decorate a wrapped package or other substantially flat structures, in which case, a flat securing member is preferred. In the an embodiment of FIG. 12, the plurality of ribbons 74 have the same structure as shown in FIG. 11. The securing member of the decoration of FIG. 12 differs from that of FIG. 11 in that the loop portion for retaining the plurality of helical ribbons 74 is formed by a staple and the fastening portion 84 formed by a paperboard, plastic, or similar backing material with an adhesive on its back surface to adhere it to a package or other substantially flat surface. It is contemplated that a wide variety of numbers of ribbons, lengths of ribbons, and positioning of securing members along the length of the ribbons may be used to fashion decorative items from the helical ribbons of the invention.

In another aspect of the invention, a method of manufacturing decorative items is provided which includes the step of providing at least one resilient ribbon having a length and width to a crimping station. The crimping station forms a plurality of crimps on a first surface of said at least one resilient ribbon which extends across the width whereby said crimps cause said at least one resilient ribbon to curl into at least one helical ribbon structure; cutting said at least one helical ribbon structure to a desired length; gathering a plurality of helical ribbon structure; securing said at least one ribbon structures with a securing member.

While the invention is described in connection with certain preferred embodiments set forth in the foregoing detailed description and Figures, it will be understood that the application is not intended to cover all alternatives, modifications and equivalents as may be included in the spirit and scope of the invention as described by the appended claims.

What is claimed:

1. A method of manufacturing a helical ribbon, including the steps of:

providing a resilient ribbon to a crimping assembly;

crimping said resilient ribbon on a first surface of said resilient ribbon to form a plurality of crimps extending diagonally across the width of said resilient ribbon whereby said plurality of crimps cause the resilient ribbon to curl into a helical structure.

2. A method of claim 1 including the additional steps of cutting said resilient ribbon to a desired length.

3. The method of claim 1, wherein said step of crimping said resilient ribbon includes the step of passing said resilient ribbon between the crimping die having a plurality of raised teeth extending across the axis of the die and a resilient roller mounted adjacent to said crimping die.

4. The method of claim 3, wherein said step of crimping said resilient ribbon includes the step of passing said resilient ribbon between the crimping die having a plurality of raised teeth which sequentially impinge on said resilient roller mounted adjacent to said crimping die.

5. The method of claim 4, wherein said step of crimping said resilient ribbon includes the step of passing said resilient ribbon between the crimping die having a plurality of raised teeth which sequentially impinge on and sink into said resilient roller mounted adjacent to said crimping die to a depth of at least ten one thousandths of an inch.

6. The method of claim 4, wherein said step of crimping said resilient ribbon includes the step of passing said resilient ribbon between the crimping die having a plurality of raised teeth which sequentially impinge on and sink into said resilient roller mounted adjacent to said crimping die such that a pair of creases is formed in at least one of said plurality of crimps.

* * * * *